E. W. BURGESS.
HAY RAKE.
APPLICATION FILED APR. 3, 1916.

1,331,481.

Patented Feb. 24, 1920.
2 SHEETS—SHEET 1.

Inventor:
Edward W. Burgess,
By Chas. E. Lord
Atty

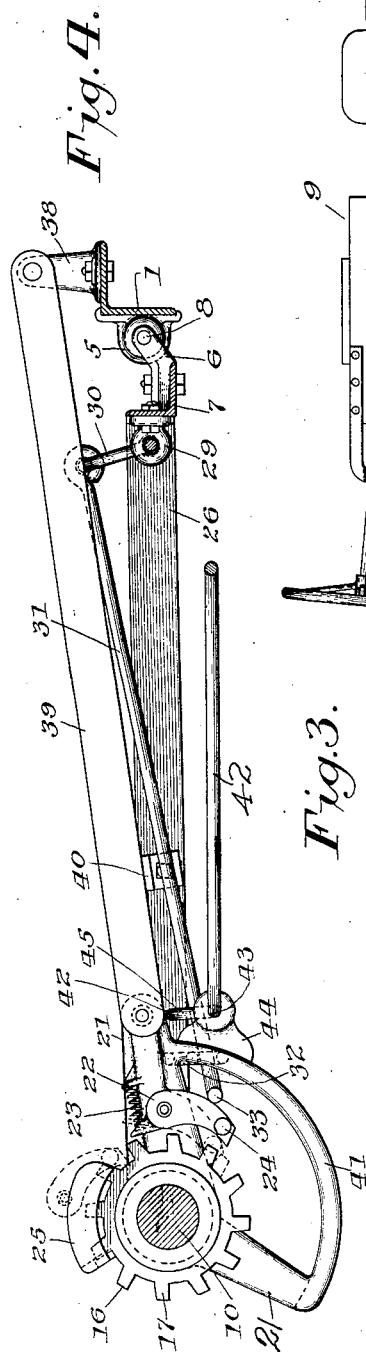
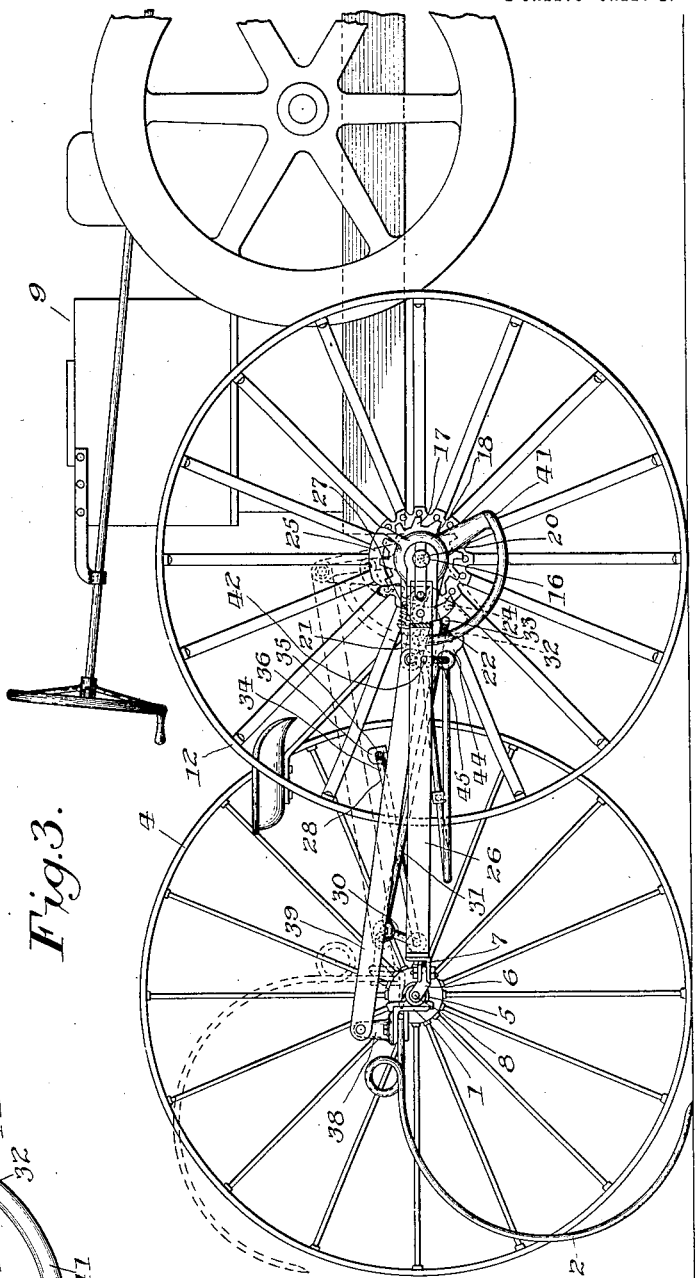

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

HAY-RAKE.

1,331,481.       Specification of Letters Patent.      Patented Feb. 24, 1920.

Application filed April 3, 1916. Serial No. 88,694.

*To all whom it may concern:*

Be it known that I, EDWARD W. BURGESS, a citizen of the United States, residing at Chicago, in the county of Cook and State of Illinois, have invented certain new and useful Improvements in Hay-Rakes, of which the following is a full, clear, and exact specification.

My invention relates to hay rakes of the self-dump type and includes means whereby a rake, preferably comprising two separable sections, may be drawn by a tractor and operatively connected therewith in a manner whereby the axle or traction wheels of the tractor actuates the self-dumping mechanism of the rake.

The object of the invention is to provide a rake having a length that enables it to operate upon a wide swath, a large capacity and a relatively light structure; to provide means whereby the rake may be quickly attached to or uncoupled from the tractor; and means whereby the operator may control the operation of the self-dumping mechanism from his seat upon the tractor.

These objects are attained by means of the mechanism illustrated in the accompanying drawing, in which—

Fig. 3 is an end elevation of Fig. 1; and

Fig. 4 is a side elevation of a detached detail on an enlarged scale and designed to illustrate the construction of part of the self-dumping mechanism.

The same reference characters designate like parts throughout the several views.

Figures 1, 2:
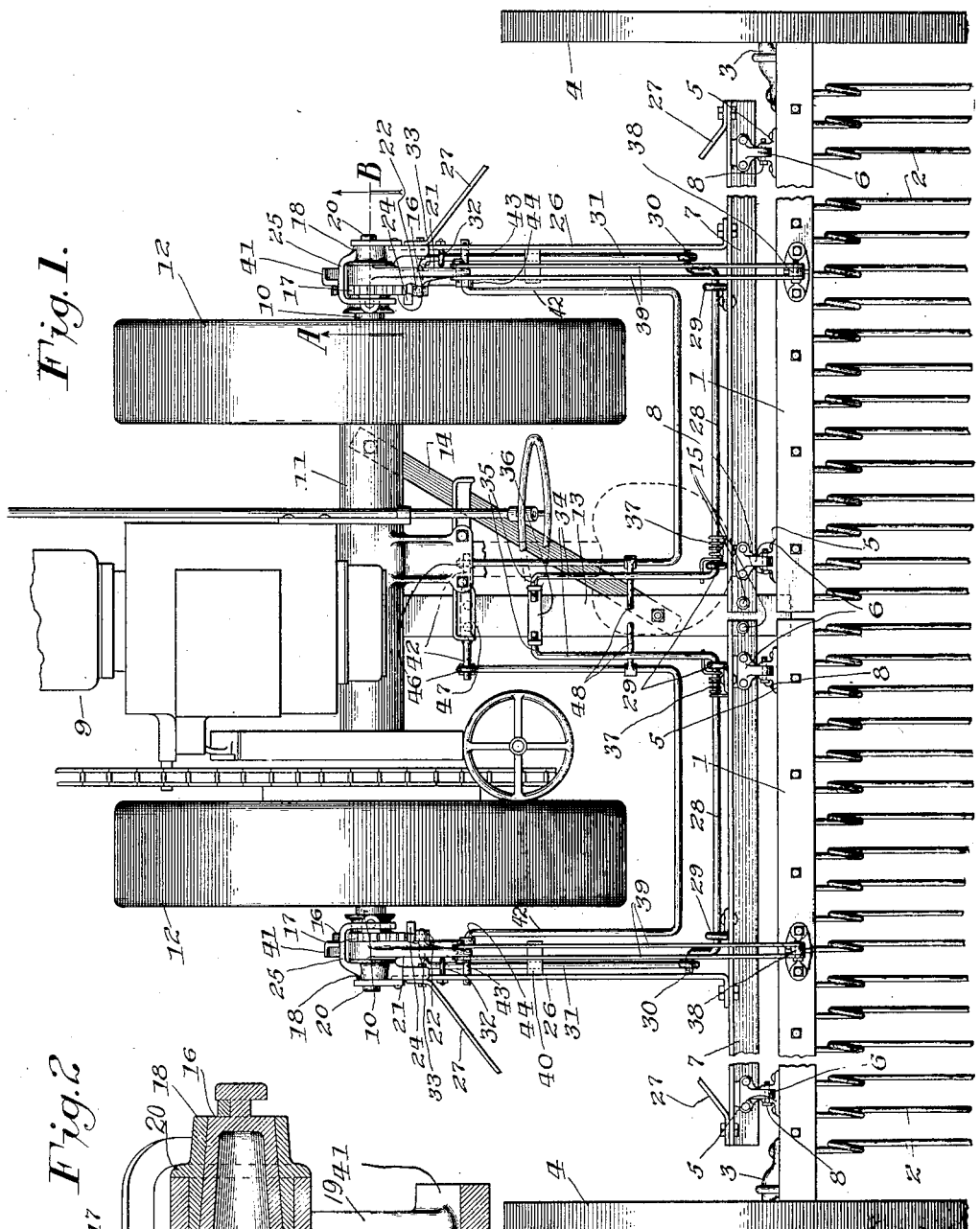
Figure 1 is a top plan view of part of a sectional hay rake operatively connected with a tractor having some of the parts broken away and having my invention embodied in its construction.
Fig. 2 is a vertical section on an enlarged scale of part of the self-dumping mechanism along line A—B of Fig. 1.

Referring to the drawings, 1 represents the rake heads of the separate sections, 2 the teeth connected therewith, 3 the stub axles secured to the outside ends of the heads and having carrying wheels 4 journaled thereon, 5 the coupling members secured to the rake heads, and 6 the complemental coupling members secured to draft members 7 and pivotally connected by means of hinge pins 8 with the coupling members 5 coaxially with the axes of the carrying wheels 4. 9 represents a tractor including a truck frame including an axle 10 journaled in a tubular member 11 of the truck frame, having traction wheels 12 mounted upon opposite ends of said axle and a draft bar 13 having its front end secured to the frame and supported laterally by means of a brace member 14. The inner ends of the draft bars 7 of the rake sections are connected with the rear end of the draft bar 13 by means of coupling pins 15, and the inner ends of the rake heads 1 rest thereon when in a raking position. Secured to opposite ends of the tractor axle 10, and rotatable therewith, are thimble skeins 16, and integral with the skeins are ratchet wheels 17. Detachably mounted upon the skeins are draft members 18 having inwardly extending hubs 19 having flange members 20. Journaled upon the hubs 19 are arms 21 having spring-pressed pawls 22 pivotally mounted upon one of said arms and adapted to engage with the ratchet wheels 17, the pawls being normally held disengaged by means of compression springs 23 and provided with laterally extending pintle members 24 that are adapted to engage with pawl releasing members 25 carried by the draft members 18. 26 represents draft connections having their rear ends secured to the draft members 7 and their front ends to the draft members 18, and 27 represents diagonally disposed supplemental draft members having their front ends secured to the draft members 18 and their rear ends to the outside ends of the draft members 7.

Means for tripping the self-dumping mechanism into action include rock shafts 28 journaled in bearing clips 29 secured to the draft members 7, the shafts having short crank arms 30 secured to their outside ends, and pivotally connected therewith are the rear ends of forwardly extending rods 31, having their front ends slidably received by eye members 32 depending from the draft connections 26 and having laterally turned ends 33 adapted to engage with the pawls 22 when the shafts 28 are rocked in one direction. The inner ends of the shafts 28 are provided with forwardly extending foot levers 34 that are provided with inwardly turned portions 35 at their front ends that are loosely received by openings in the opposite ends of a stirrup member 36 whereby the operator may trip both pawls into action together or one independent of the other, if desired, and 37 represents torsional springs mounted upon the inner ends of the shafts and engaging with the foot levers 34 and draft members 7 in a manner to normally retain the front end of the rods 31 from engagement with the pawls 22. 38 represent vertically disposed arms secured to the rake heads 1, that are pivotally connected with the free ends of the arms 21, each by means of a pair of links 39, and 40 represents stop members carried by the draft connections 26 and adapted to engage with the links in a manner to limit a downward swing of the arms 21 and links 39. 41 represents brake sectors integral with the arms 21, and 42 are U-shaped brake levers having their respective side arms extending forward upon opposite sides of one of the traction wheels of the tractor and provided at their front ends with outwardly extending arms 43, upon which are pivotally mounted brake shoes 44 that are adapted to engage with the brake sectors 41, and secured to the outside ends of the arms 43, beyond the brake shoes, are vertical lever arms 45 having their upper ends pivotally connected to the draft connections 26. The inner sides of the U-shaped brake levers are provided with eye members 46 that receive the opposite ends of a fulcrum member 47 secured to the draw bar of the tractor, the axes of the eyes being in substantial alinement with the pivotal connection of the arms 45 with the draft connections 26, and 48 represents inwardly extending arms secured to the rear ends of the adjacent side members whereby the operator may, with his foot, apply the brakes simultaneously to both the brake sectors or permit an independent operation thereof.

In operation the operator from the seat of the tractor controls its steering mechanism and its forward and reverse gearing, and his foot controls the rake dumping and brake mechanism. The arms 21 and links 39 form a positive toggle lock controlled by the stop member 40 when the rake teeth are in an operative position, which is automatically released when the pawls 22 engage with the ratchet wheels 17. The brake mechanism is operative to hold either or both of the rakes from returning from a dumping to an operative position or to prevent a too rapid return movement thereof. The inner ends of the rake sections are loosely connected with and carried by the draw bar of the tractor in a manner permitting a free and independent movement of their outer ends as the carrying wheels follow irregular ground surfaces.

Having illustrated and described one embodiment of my invention, I do not wish to have it limited closely to the specific details of its construction as shown, it being understood that many changes may be made in the form, proportion and organization of its various parts without departing from its spirit as indicated in the appended claims.

What I claim as my invention and desire to secure by Letters Patent is:

1. In a hay rake, raking mechanism comprising a plurality of rake sections, power actuated means for moving said sections from raking to dumping position and means for independently controlling the connections between said power actuated means and each of said sections.

2. In a hay rake, raking mechanism comprising a plurality of sections, power actuated means for moving said sections from raking to dumping position, and controlling means for said power actuated means whereby said sections may be dumped singly or simultaneously.

3. In a hay rake, raking mechanism, means for moving said raking mechanism from raking to dumping position, and manually controlled braking mechanism for controlling the return movement of said raking mechanism.

4. In a hay rake, a driven shaft, raking mechanism, means operatively connecting said raking mechanism to said shaft for moving said mechanism from raking to dumping position, and manually controlled braking means for controlling the return movement of said raking mechanism.

5. In a hay rake, a driven shaft, raking mechanism, means for operatively connecting said raking mechanism to said shaft for raising such mechanism to dumping position, and means including an element carried by said shaft for controlling the return movement of said raking mechanism.

6. In a hay rake, a pivoted rake head, a driven shaft, operative connections between said shaft and said rake head for actuating said rake head, and manually controlled braking mechanism for controlling the return of said head to normal or raking position.

7. In a hay rake, raking mechanism comprising a plurality of sections, means for moving said sections from raking to dumping position, and manually controlled braking mechanism for controlling the return movement of said sections from dumping to raking position.

8. In a hay rake, raking mechanism comprising a plurality of sections, independently operable means for moving said sections from raking to dumping position, and independently operable braking means for controlling the return movement of said sections from dumping to raking position.

9. In a hay rake, raking mechanism, comprising a plurality of sections, means operable independently or simultaneously for moving said sections from raking to dumping position, and means operable independently or simultaneously for braking the return movement of said sections from dumping to raking position.

10. In a hay rake, a driven shaft, a pivoted rake head having raking elements thereon, operative connections between said rake head and said shaft whereby said rake head may be actuated from raking to dumping position, and means including an element carried by said operative connections for braking the return movement of said rake head from dumping to raking position.

11. In combination, a tractor including an axle and traction wheels mounted upon said axle, a rearwardly extending draft bar, a self-dumping hay rake disposed in rear of said tractor and transversely thereof, said rake including a transverse draft member connected with the rear end of said rearwardly extending draft bar, a rake head pivotally connected with said transverse draft member, a carrying wheel mounted upon said head coaxially with its pivotal connection with said member, rake teeth carried by said head, a draft connection between the draft member of the rake and the tractor axle, rake dumping mechanism mounted upon said axle receiving power therefrom and connected with said head, and means for controlling the operation of said dumping mechanism.

12. In combination, a tractor including a draft bar, an axle and traction wheels mounted upon said axle, a self-dumping rake comprising two sections disposed in rear of said tractor and transversely thereof, said sections including transversely disposed draft members having their ends detachably connected with and supported by the draft bar of said tractor, longitudinally disposed draft connections between said transverse draft members and opposite ends of said tractor axle, diagonally disposed draft members connecting the outside ends of said transverse draft members with the front ends of said longitudinally disposed draft connections, rake heads pivotally connected with said transverse draft members and having carrying wheels journaled upon their outside ends, rake teeth carried by said heads, and means operatively connecting said tractor axle with said rake heads for dumping said rakes.

13. In combination, a tractor including an axle and traction wheels mounted upon said axle, a self-dumping hay rake comprising separable sections disposed in rear of said tractor and transversely thereof, said rake sections including draft members and rocking tooth carrying heads pivotally connected with said draft members, draft connections between said draft members and said tractor, and means operatively connecting said tractor axle and said rocking heads for dumping said rake sections.

14. In combination, a tractor including an axle and traction wheels mounted upon said axle, a self-dumping hay rake comprising separable sections disposed in rear of said tractor and transversely thereof, said rake sections including draft members and rocking tooth carrying heads pivotally connected with said draft members, draft connections between said draft members and said tractor, and means operatively connecting said tractor axle and said rocking heads for independently dumping said rake sections.

15. In combination, a tractor including an axle and traction wheels mounted upon said axle, a self-dumping hay rake comprising two separable sections disposed in rear of said tractor and transversely thereof, said rake sections including transverse draft members, rocking tooth carrying heads pivotally connected with said draft members, draft connections between said draft members and said tractor, and rake dumping mechanism carried by the axle of said tractor and operatively connected with said heads, said dumping mechanism including a brake mechanism controlling a return of said heads from a dumping to a raking position.

16. In combination, a tractor including a draft bar, an axle and traction wheels mounted upon said axle, a self-dumping hay rake disposed in rear of said tractor and transversely thereof, said rake including a transverse draft member connected with the draft bar of said tractor, a rocking tooth carrying head pivotally connected with said draft member, a ratchet wheel secured to said tractor axle and rotatable therewith, a draft connection between said axle and said transverse draft member of said rake, an arm carried by said axle and turnable about the axis thereof, a pawl pivotally mounted upon said arm and engageable with said ratchet wheel, a link connection between the free end of said arm and said rocking head, and means for controlling an engagement of said pawl with said ratchet wheel.

17. In combination, a tractor including a draft bar, an axle and traction wheels mounted upon said axle, a self-dumping hay rake disposed in rear of said tractor and transversely thereof, said rake including a transverse draft member connected with the draft bar of said tractor, a rocking tooth carrying head pivotally connected with said draft member, a ratchet wheel secured to said tractor axle and rotatable therewith, a draft connection between said axle and said transverse draft member of said rake, an arm carried by said axle and turnable about the axis thereof, a pawl pivotally mounted upon said arm and engageable with said ratchet wheel, a brake rim carried by said arm, a brake shoe engageable with said rim, a link connection between the free end of said arm and said rocking head, and means for controlling an engagement of said pawl with said ratchet wheel and an engagement of said shoe with said brake rim.

18. In combination, a tractor including a draft bar, an axle and traction wheels mounted upon said axle, a self-dumping hay rake disposed in rear of said tractor and transversely thereof, said rake including a transverse draft member connected with the draft bar of said tractor, a rocking tooth carrying head pivotally connected with said draft member, a ratchet wheel secured to said tractor axle and rotatable therewith, a draft connection between said axle and said transverse draft member of said rake, an arm carried by said axle and turnable about the axis thereof, a pawl pivotally mounted upon said arm and engageable with said ratchet wheel, a link connection between the free end of said arm and said rocking head, means for controlling an engagement of said pawl with said ratchet wheel, said pawl controlling means including a rod slidably mounted upon the draft connection between the axle and said transverse draft member of the rake having one end engageable with said pawl, and a foot lever operatively connected with the opposite end of said rod.

19. In combination, a tractor including a draft bar, an axle and traction wheels mounted upon said axle, a self-dumping hay rake disposed in rear of said tractor and transversely thereof, said rake including a transverse draft member connected with the draft bar of said tractor, a rocking tooth carrying head pivotally connected with said draft member, a ratchet wheel secured to said tractor axle and rotatable therewith, a draft connection between said axle and said transverse draft member of said rake, an arm carried by said axle and turnable about the axis thereof, a pawl pivotally mounted upon said arm and engageable with said ratchet wheel, a brake rim carried by said arm, a brake shoe engageable with said rim, a link connection between the free end of said arm and said rocking head, means for controlling an engagement of said shoe with said brake rim, said brake controlling mechanism including a U-shaped lever having one of its side members pivotally connected with the draft bar of the tractor and its opposite side member with the draft connection with said axle and provided with a lever arm having said brake shoe mounted thereon, a link connection between the free end of said arm and said rocking head, and means for controlling an engagement of said pawl with said ratchet wheel.

20. In combination, a tractor including a draft bar, an axle and traction wheels mounted thereon, a self-dumping hay rake disposed in rear of said tractor, said rake comprising two separable sections including transversely disposed draft members having their inner ends detachably connected with said tractor draft bar, rocking tooth carrying heads pivotally connected with said draft members, carrying wheels journaled upon the outer ends of said heads, longitudinally disposed draft connections between the opposite ends of said tractor axle and the transversely disposed draft members of said rake, ratchet wheels mounted upon opposite ends of said axle and rotatable therewith, arms carried by said axle adjacent said ratchet wheels and turnable about the axes thereof, links connecting said arms with said rocking heads, pawls pivotally mounted upon said arms and engageable with said ratchet wheels, a pawl tripping mechanism including rods having one end thereof slidably carried by said longitudinally disposed draft connections, rock shafts journaled upon the transversely disposed draft members of said rake, crank arms upon opposite ends of said shafts operatively connected with said pawl tripping rods, and independent levers upon the inner ends of said rock shafts whereby said pawls may be operated in unison or selectively.

21. In combination, a tractor including a draft bar, an axle and traction wheels mounted thereon, a self-dumping hay rake disposed in rear of said tractor, said rake comprising two separable sections including transversely disposed draft members having their inner ends detachably connected with said tractor draft bar, rocking tooth carrying heads pivotally connected with said draft members, carrying wheels journaled upon the outer ends of said heads, longitudinally disposed draft connections between the opposite ends of said tractor axle and the transversely disposed draft members of said rake, ratchet wheels mounted upon opposite ends of said axle and rotatable therewith, arms carried by said axle adjacent said ratchet wheels and turnable about the axes thereof, links connecting said arms with said rocking heads, pawls pivotally mounted upon said arms and engageable with said ratchet wheels, brake rims carried by said arms, brake shoes engageable with said rims, shoe carrying members, said members being U-shaped and having their outside arms pivotally connected with the longitudinally disposed draft connections and their inner adjacent arms with the draft bar of said tractor whereby said shoe carrying members may be operated in unison or selectively.

22. In combination, a tractor, a rake propelled thereby, power means for raising the raking element of the rake from the tractor, and manually controlled braking mechanism for retarding the return movement of said raking element.

23. In combination, a tractor having an axle, a rake propelled by the tractor, an operative connection between the tractor axle and raking element of the rake whereby the latter may be raised, braking mechanism for controlling the return movement of said raking element, and means for manually controlling said braking mechanism.

24. In combination, a tractor, a rake propelled thereby, power means for raising the raking element of the rake from the tractor, means for controlling the raising of the rake, and manually controlled braking mechanism for retarding the return movement of said raking element.

In testimony whereof I affix my signature.

EDWARD W. BURGESS.